United States Patent
Tang et al.

(10) Patent No.: US 8,794,645 B2
(45) Date of Patent: Aug. 5, 2014

(54) LIQUID CRYSTAL TELEVISION AND CORRESPONDING MOVING DEVICE THEREOF

(71) Applicant: Shenzhen China Star Optoelectronics Technology Co., Ltd., Guangdong (CN)

(72) Inventors: Guofu Tang, Shenzhen (CN); Yuchun Hsiao, Shenzhen (CN); Weifeng Chen, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 13/809,929

(22) PCT Filed: Dec. 25, 2012

(86) PCT No.: PCT/CN2012/087377
§ 371 (c)(1),
(2), (4) Date: Jan. 14, 2013

(65) Prior Publication Data
US 2014/0168527 A1    Jun. 19, 2014

(51) Int. Cl.
*B62B 5/00*    (2006.01)
*H04N 5/64*    (2006.01)

(52) U.S. Cl.
CPC .................................. *H04N 5/64* (2013.01)
USPC ........................................ 280/79.7; 348/836

(58) Field of Classification Search
USPC .......... 280/79.11, 79.3, 79.7, 47.34; 348/836, 348/837, 838, 848; 312/349, 223.1, 351.1, 312/352
See application file for complete search history.

(56) References Cited

U.S. PATENT DOCUMENTS

| | | | |
|---|---|---|---|
| 7,621,544 B2 * | 11/2009 | Rossini | 280/79.3 |
| 7,986,373 B2 * | 7/2011 | Maruta | 348/836 |
| 8,045,342 B2 * | 10/2011 | Jeong | 361/816 |
| D661,124 S * | 6/2012 | Curbbun et al. | D6/396 |
| 8,368,822 B2 * | 2/2013 | Suzuki et al. | 348/836 |
| 2008/0315734 A1 * | 12/2008 | Birsel et al. | 312/223.3 |
| 2010/0085493 A1 * | 4/2010 | Liao | 348/836 |

* cited by examiner

*Primary Examiner* — John Walters
(74) *Attorney, Agent, or Firm* — Andrew C. Cheng

(57) ABSTRACT

The present invention provides a moving device for LCTV, which includes: a base, disposed with a plurality of rollers; two support racks, disposed on the base; each support rack being disposed with a support base, the support base at least extending partially into the enhanced beam of the backplane of the LCTV to be moved. The present invention also provides an LCTV disposed with enhanced beams on the backplane. According to the embodiments of the present invention, the moving device is easy to operate and low cost for moving large-size LCTV.

15 Claims, 5 Drawing Sheets

LIQUID CRYSTAL TELEVISION AND CORRESPONDING MOVING DEVICE THEREOF

The present application claims priority of "LIQUID CRYSTAL TELEVISION AND CORRESPONDING MOVING DEVICE THEREOF", application number 201210554001.1 submitted to State Intellectual Property Office, People Republic of China dated Dec. 19, 2012.

BACKGROUND OF THE INVENTION

1. Field of the Invention

The present invention relates to the field of liquid crystal television and moving device, and in particular to a large-size liquid crystal television and moving device.

2. The Related Arts

In manufacturing liquid crystal display device (LCD), moving a large-size (e.g., 60 in and more) LCD is often a challenge. For large-size LCD, both size and weight exceeds the comfort range of ergonomics, and the moving usually requires a plurality of people with small mobile trolley to accomplish.

In known moving technique, the trolley often only allows to place the liquid crystal module flatly, which usually occupies a larger area and difficult to move around in small space. In addition, the liquid crystal module is usually required to hang by the wall hole at the backplane onto the pillar of the trolley for fixing. When the large-size liquid crystal module is placed flatly with backplane at the bottom, the operation of manually fixing the liquid crystal module onto the trolley would be extremely difficult because of the weight and the operators must lift the liquid crystal module throughout the entire fixing process, and accidents are prone to occur. On the other hand, if lifting equipment is used to lift the liquid crystal module, a much larger operation space is required. In addition, the lifting equipment is often difficult to move around; thus, the application area is often confined to certain selected areas, resulting in higher equipment cost.

SUMMARY OF THE INVENTION

The technical issue to be addressed by the present invention is to provide a liquid crystal television (LCTV) and corresponding moving device for moving large-size LCTV, easy to operate and low in cost.

The present invention provides a moving device for LCTV, which comprises: a base, disposed with a plurality of rollers; two support racks, disposed on the base; each support rack being disposed with a support base, the support base at least extending partially into the enhanced beam of the backplane of the LCTV to be moved; the support base comprising: a support base body, roughly substantially in a shape of pillar; support blocks, disposed on two sides of the support base body, the top of the support block having a support surface for placing withstanding the bottom of the enhanced beam of the backplane of the LCTV.

According to a preferred embodiment of the present invention, the support rack further comprises: a support element of a long stripe configuration, the long stripe-shaped support element at least partially extending above the upper surface of the support base body for extending into the enhanced beam of the backplane of the LCTV to prevent the LCTV from tipping over.

According to a preferred embodiment of the present invention, the support surface of the support block is lower than the upper surface of the support base body.

According to a preferred embodiment of the present invention, a placement board is disposed at a location on each support rack near the support base, for withstanding the bottom of the LCTV.

According to a preferred embodiment of the present invention, an L-shaped fixing element is further disposed on each support rack at the location near the placement board, a part of the fixing element is attached to the support rack and the other part of the fixing element extends upwards in a direction substantially parallel to the support element of the long stripe configuration.

According to a preferred embodiment of the present invention, the backplane of the LCTV to be moved is disposed vertically with two enhanced beams of long stripe configuration, the enhanced beam is formed by bending a plate material with a an U-shaped cross-section; the enhanced beam forms an accommodation space with the backplane of LCTV, the accommodation space is for at least housing a part of support rack body and the long stripe-shaped support element on the support base.

According to a preferred embodiment of the present invention, the enhanced beam on the backplane is disposed with screw hole and the support base body is also disposed with screw hole at corresponding position for fixing the enhanced beam on the backplane to the support base by using a screw to penetrate the corresponding screw holes on the enhanced beam on the backplane and the support base respectively.

The present invention provides a moving device for LCTV, which comprises: a base, disposed with a plurality of rollers; two support racks, disposed on the base; each support rack being disposed with a support base, the support base further comprising a support element of a long stripe configuration, the long stripe-shaped support element at least partially extending above the upper surface of the support base body for extending into the enhanced beam of the backplane of the LCTV to prevent the LCTV from tipping over; the support base comprising: a support base body, substantially in a shape of pillar; support blocks, disposed on two sides of the support base body, the top of the support block having a support surface for withstanding the bottom of the enhanced beam of the backplane of the LCTV.

According to a preferred embodiment of the present invention, the support surface of the support block is lower than the upper surface of the support base body.

According to a preferred embodiment of the present invention, a placement board is disposed at a location on each support rack near the support base, for withstanding the bottom of the LCTV.

According to a preferred embodiment of the present invention, an L-shaped fixing element is further disposed on each support rack at the location near the placement board, a part of the fixing element is attached to the support rack and the other part of the fixing element extends upwards in a direction substantially parallel to the support element of the long stripe configuration.

According to a preferred embodiment of the present invention, the backplane of the LCTV to be moved is disposed vertically with two enhanced beams of long stripe configuration, the enhanced beam is formed by bending a plate material with a an U-shaped cross-section; the enhanced beam forms an accommodation space with the backplane of LCTV, the accommodation space is for at least housing a part of support rack body and the long stripe-shaped support element on the support base.

According to a preferred embodiment of the present invention, the enhanced beam on the backplane is disposed with screw hole and the support base body is also disposed with screw hole at corresponding position for fixing the enhanced beam on the backplane to the support base by using a screw to penetrate the corresponding screw holes on the enhanced beam on the backplane and the support base respectively.

The present invention provides a liquid crystal television (LCTV), which comprises: a TV main body, which at least comprising a backplane; two enhanced beams of long stripe configuration, disposed vertically on the backplane, the enhanced beam being formed by bending a plate material with a an U-shaped cross-section; the enhanced beam forming an accommodation space with the backplane of LCTV, the accommodation space being for inserting an element of a moving device to stably support the LCTV on the moving device.

According to a preferred embodiment of the present invention, the enhanced beam on the backplane is disposed with screw hole for fixing to the moving device by a screw.

The efficacy of the present invention is that to be distinguished from the state of the art. Based on the embodiments of the present invention, because the backplane of the LCTV is disposed with enhanced beams with accommodation space for inserting long stripe-shaped support element of a moving device to fix the LCTV to the moving device, the present invention enables convenient operation, no restricted by the operation area as well as low cost; by disposing L-shaped fixing element on the moving device, the present invention further prevent the LCTV from tipping over during moving; and the present invention allows locking the LCTV to the moving device by screw to further enhance stability during moving.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

The following refers to the drawings to describe the preferred embodiments of the present invention.

Figure 1:
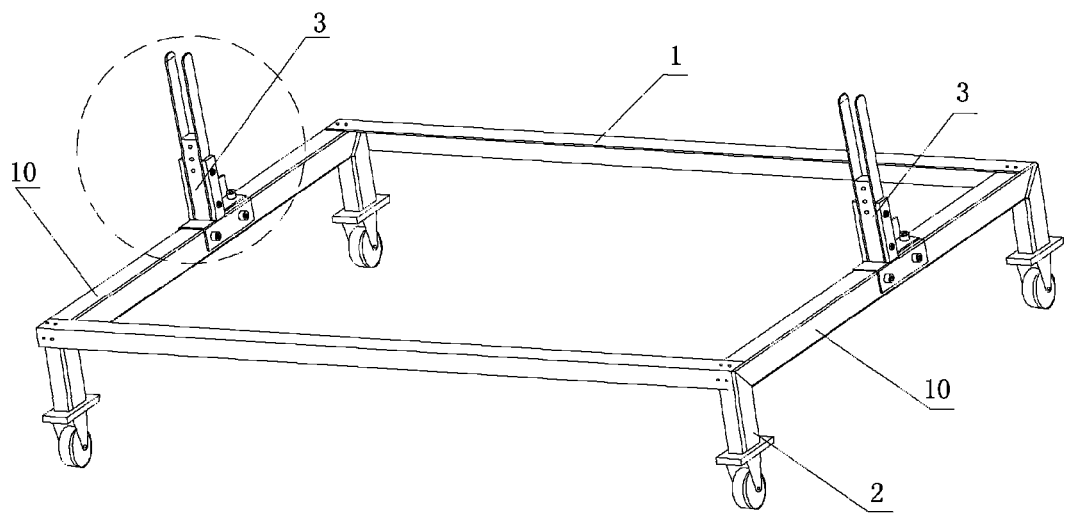
FIG. 1 is a schematic view showing the structure of the first embodiment of a moving device for LCTV according to the present invention.
Figure 2:
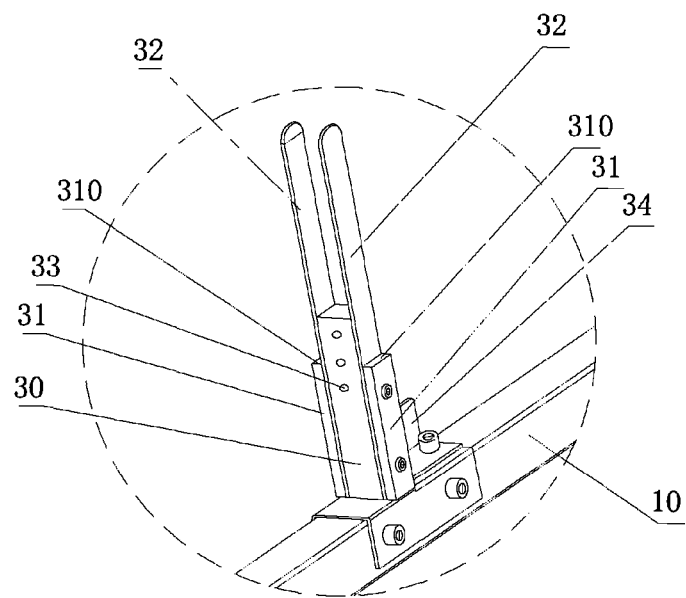
FIG. 2 is a partial enlarged view of FIG. 1.
Figure 3:
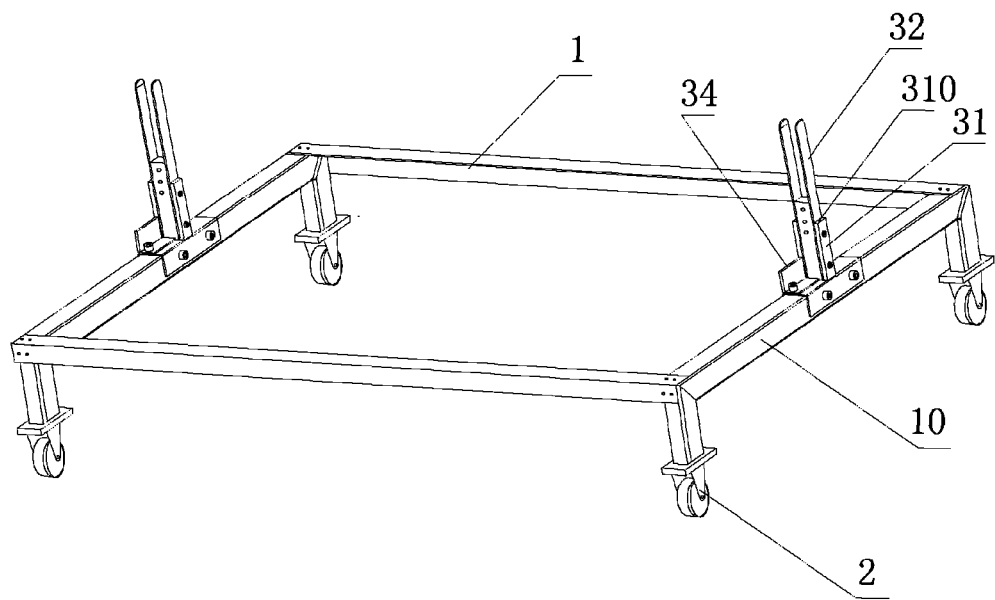
FIG. 3 is a schematic view of the moving device in FIG. 1 from a different angle.

Referring to FIGS. 1-3, FIGS. 1-3 show the first embodiment of a moving device for LCTV according to the present invention. As shown in FIGS. 1-3, the moving device for LCTV comprises:

A base 1, disposed with a plurality of rollers 2, the base 1 able to move through the plurality of rollers 2, in FIG. 1, the base 1 is a frame structure, it is noted that other support structure can also be used, for example, base 1 can be a structure with frame engaged to a bottom plate; and Two support racks 10, disposed on the base 1;

Wherein each support rack 10 being disposed with a support base 3, the support base 3 at least extending partially into the enhanced beam of the backplane of the LCTV to be moved;

The support base 3 comprising: a support base body 30, substantially in a shape of pillar; and Support blocks 31, disposed on two sides of the support base body 30, the top of the support block 31 having a support surface 310 for withstanding the bottom of the enhanced beam of the backplane of the LCTV; the support surface 310 of the support block 31 being lower than the upper surface of the support base body 30; wherein the support block 31 and the support base body 30 being formed either monolithically or by assembling different elements. FIG. 1 shows a view that the formation is by assembling different elements with screws.

In the instant embodiment, the support rack 3 further comprises: a support element 32 of a long stripe configuration, the long stripe-shaped support element 32 at least partially extending above the upper surface of the support base body 30 for extending into the enhanced beam of the backplane of the LCTV to prevent the LCTV from tipping over.

In addition, a placement board 34 is disposed at a location on each support rack 10 near the support base 3, for withstanding the bottom of the LCTV.

The support base body 30 is disposed with screw hole 33 at side wall.

Figure 4:
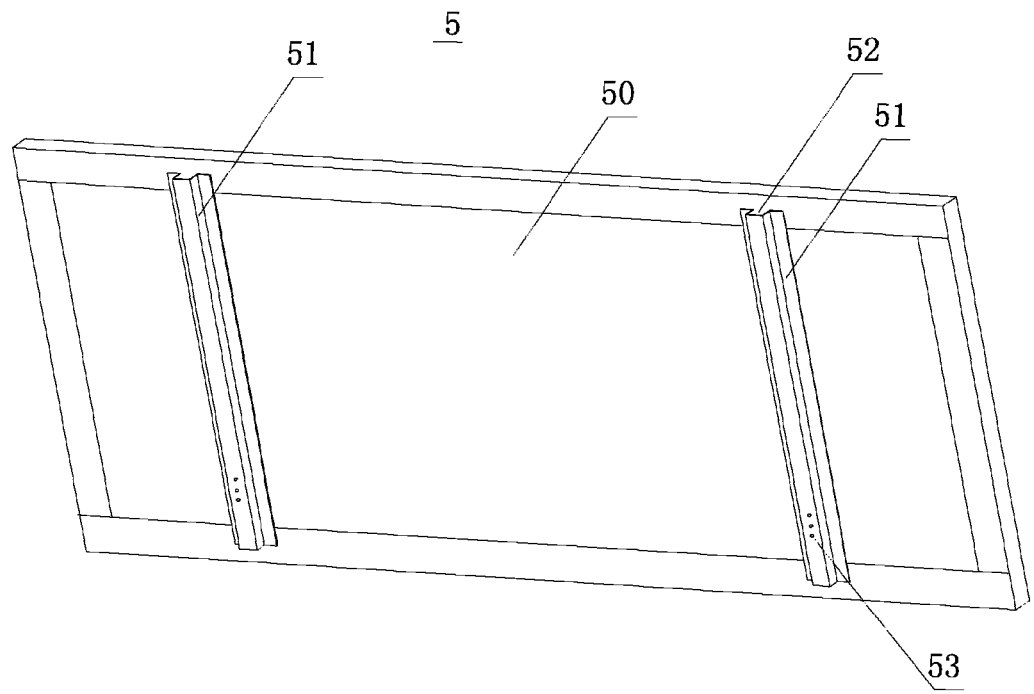
FIG. 4 is a schematic view showing the back of an LCTV according to the present invention.

FIG. 4 shows a schematic view of an LCTV of the present invention. The LCTV comprises:

A TV main body, which at least comprising a backplane 50, disposed at the back of the TV main body; and Two enhanced beams 51 of long stripe configuration, disposed vertically on the backplane 50, the enhanced beam being formed by bending a plate material with a an U-shaped cross-section; the enhanced beam 51 forming an accommodation space 52 with the backplane 50 of LCTV, the accommodation space being for inserting an element of a moving device to stably support the LCTV on the moving device.

In the instant embodiment, the enhanced beam 51 on the backplane 50 is disposed with screw hole 53 for fixing to the moving device by a screw.

Figure 5:
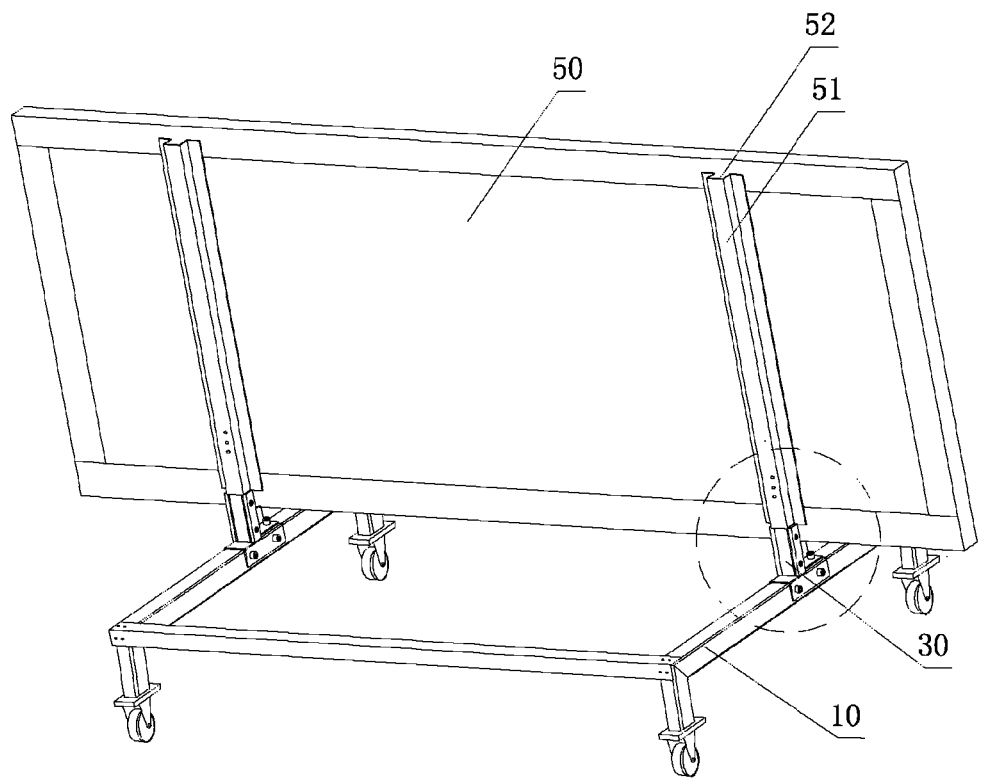
FIG. 5 is a schematic view showing matching the LCTV with the moving device of FIG. 1.
Figure 6:
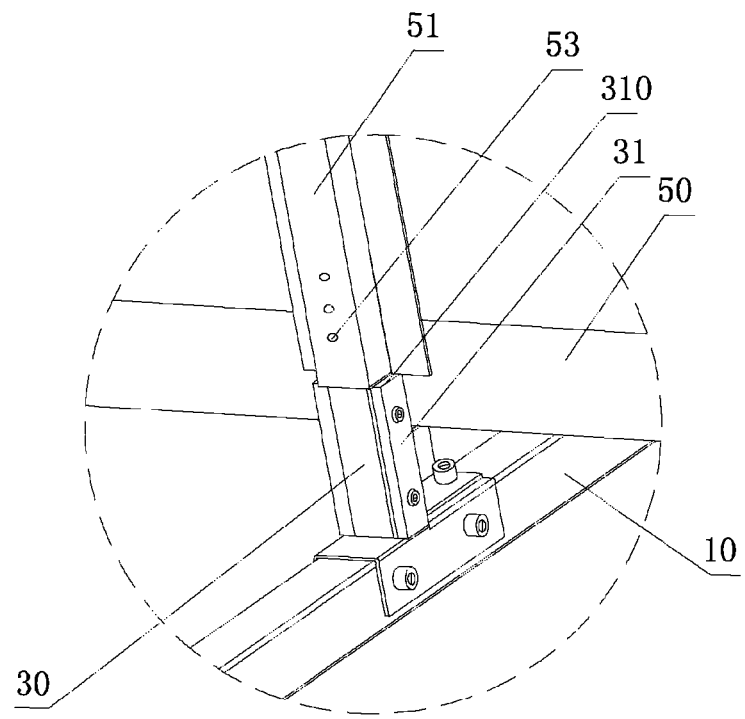
FIG. 6 is a partial enlarged view of FIG. 5.
Figure 7:
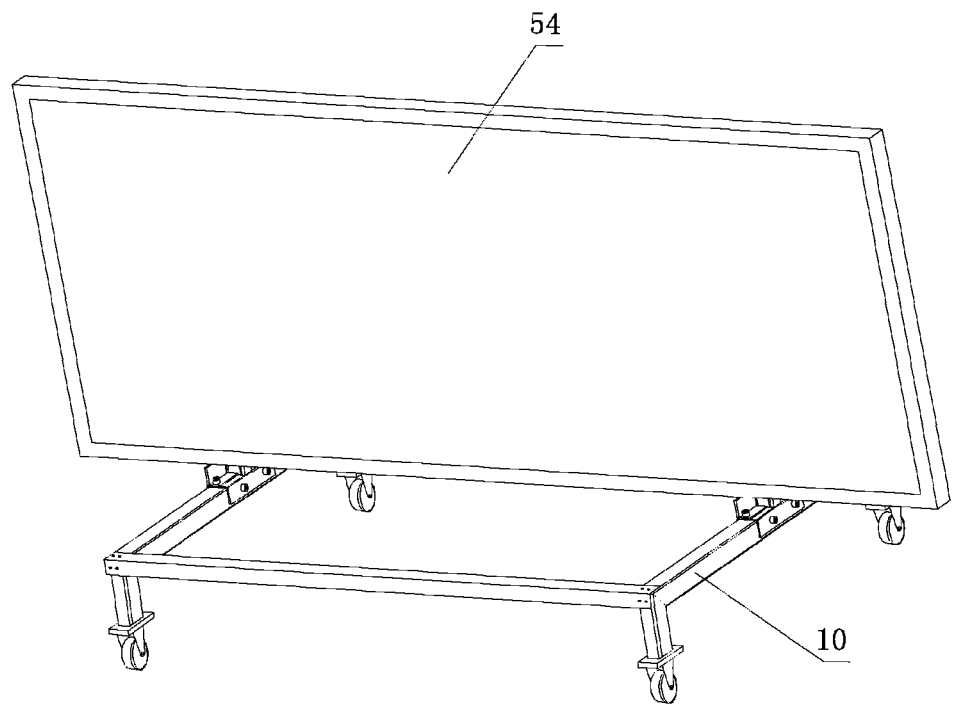
FIG. 7 is a schematic view of the moving device in FIG. 5 from a different angle.

FIGS. 5-7 show schematic views of the moving device of the present invention in FIG. 1-3 matching with the LCTV. A shown in FIGS. 5-7, when moving an LCTV, the LCTV is placed vertically onto the moving device. At this point, the accommodation space 52 formed by the vertically disposed enhanced beam 51 and the backplane 50 can accommodate a part of the support base body 30 and the long stripe-shaped support element 32 located on the support base 6. In addition, the bottom of the LCTV is placed on the placement board 34 of the moving device and the bottom of the enhanced beam 51 is placed on the support surface 310 at the top of the support block 31 on two sides of the support base body 30. As such, the LCTV is attached to the moving device.

To further enhance the stability during moving, a screw can be used to penetrate the corresponding screw hole 53 on the enhanced beam 51 and corresponding screw hole 33 on the support base 3 respectively to further lock the enhanced beam and the support base 3.

In addition, a buffering material can be disposed at the contact between the LCTV and the moving device, such as, between the bottom of the LCTV and the placement board 34 of the moving device, and between the bottom of the enhanced beam 51 and the support surface 310 at the top of the support block 31 to reduce the abrasion on the LCTV during moving.

FIG. 7 is a schematic view of FIG. 5 from a different angle, wherein a different view of the LCTV id shown, i.e., the side with the liquid crystal panel 54.

Figure 8:
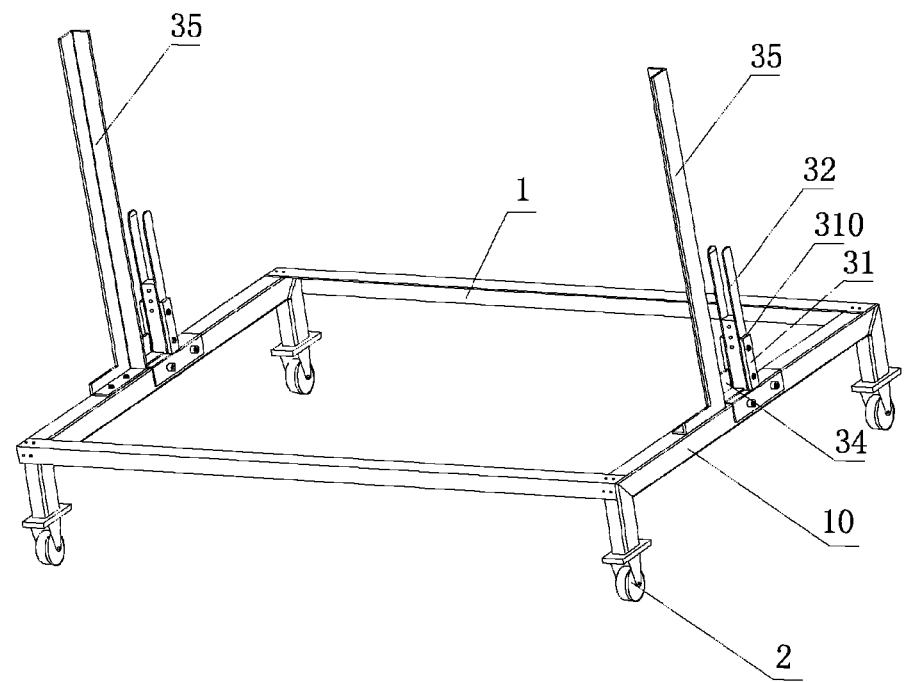
FIG. 8 is a schematic view showing the structure of the second embodiment of a moving device for LCTV according to the present invention.

FIG. 8 shows a schematic view of the moving device of the second embodiment of the present invention. The present embodiment differs from the first embodiment of FIGS. 1-3 in that an L-shaped fixing element 35 is further disposed on each support rack 3 at the location near the placement board 34, a part of the fixing element 35 is attached to the support rack 3 and the other part of the fixing element 35 extends upwards in a direction substantially parallel to the support element 32 of the long stripe configuration, i.e., parallel or slightly tilting. The other elements of the moving device are the same as the corresponding elements in FIG. 1, and the detailed description will not be repeated here.

Figure 9:
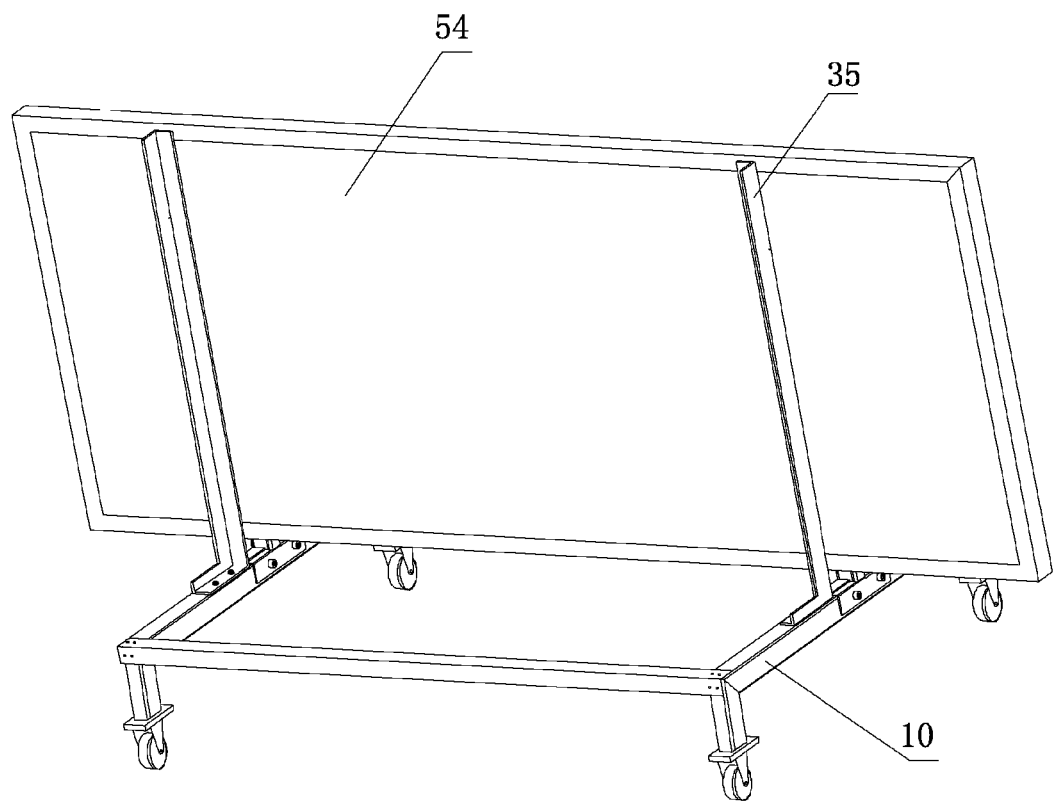
FIG. 9 is a schematic view showing matching the LCTV with the moving device of FIG. 8.

FIG. 9 is a schematic view showing the matching between the moving device of FIG. 8 and an LCTV. FIG. 9 shows a view of the side of liquid crystal panel 54 of the LCTV. As shown, after the LCTV is placed onto the moving device of FIG. 8, the extending part of the L-shaped fixing element 35 of the moving device presses against the side frame of the liquid crystal panel 54 of the LCTV to further prevent from tilting or shaking during moving. The view of the other side can refer to FIG. 5, and will not be described here.

Similarly, a buffering material can be disposed at the contact between the fixing element 35 and the liquid crystal panel 54 to reduce the abrasion on the LCTV during moving.

According to the embodiments of the present invention, the efficacy of the present invention includes: based on the embodiments of the present invention, because the backplane of the LCTV is disposed with enhanced beams with accommodation space for inserting long stripe-shaped support element of a moving device to fix the LCTV to the moving device, the present invention enables convenient operation, no restricted by the operation area as well as low cost; by disposing L-shaped fixing element on the moving device, the present invention further prevent the LCTV from tipping over during moving; and the present invention allows locking the LCTV to the moving device by screw to further enhance stability during moving.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A moving device for LCTV, which comprises:
    a base, disposed with a plurality of rollers;
    two support racks, disposed on the base;
    each support rack being disposed with a support base, the support base at least extending partially into an enhanced beam of a backplane of the LCTV to be moved;
    the support base comprising: a support base body, substantially in a shape of pillar; and
    support blocks, disposed on two sides of the support base body, a top of the support block having a support surface for withstanding a bottom of the enhanced beam of the backplane of the LCTV.

2. The moving device for LCTV as claimed in claim 1, characterized in that the support rack further comprises:
    a support element of a long stripe configuration, the long stripe-shaped support element at least partially extending above an upper surface of the support base for extending into the enhanced beam of the backplane of the LCTV to prevent the LCTV from tipping over.

3. The moving device for LCTV as claimed in claim 2, characterized in that the support surface of the support block is lower than the upper surface of the support base.

4. The moving device for LCTV as claimed in claim 3, characterized in that a placement board is disposed at a location on each support rack near the support base, for withstanding a bottom of the LCTV.

5. The moving device for LCTV as claimed in claim 4, characterized in that an L-shaped fixing element is further disposed on each support rack at a location near the placement board, a part of the fixing element is attached to the support rack and the other part of the fixing element extends upwards in a direction substantially parallel to the support element of the long stripe configuration.

6. The moving device for LCTV as claimed in claim 5, characterized in that the backplane of the LCTV to be moved is disposed vertically with two enhanced beams of long stripe configuration, the enhanced beam is formed by bending a plate material with a U-shaped cross-section; the enhanced beam defines an accommodation space with the backplane of LCTV, the accommodation space is for at least housing a part of support rack and the long stripe-shaped support element on the support base.

7. The moving device for LCTV as claimed in claim 4, characterized in that the backplane of the LCTV to be moved is disposed vertically with two enhanced beams of long stripe configuration, the enhanced beam is formed by bending a plate material with a U-shaped cross-section; the enhanced beam defines an accommodation space with the backplane of LCTV, the accommodation space is for at least housing a part of support rack and the long stripe-shaped support element on the support base.

8. The moving device for LCTV as claimed in claim 7, characterized in that the enhanced beam on the backplane is defined with at least a screw hole and the support base is also defined with at least a screw hole at corresponding position for fixing the enhanced beam on the backplane to the support base by using a screw to penetrate the corresponding screw holes on the enhanced beam on the backplane and the support base respectively.

9. A moving device for LCTV, which comprises:
    a base, disposed with a plurality of rollers;
    two support racks, disposed on the base;
    each support rack being disposed with a support base, the support base further comprising:
    a support element of a long stripe configuration, the long stripe-shaped support element at least partially extending above an upper surface of the support base body for extending into an enhanced beam of a backplane of the LCTV to prevent the LCTV from tipping over;
    the support base comprising: a support base body, substantially in a shape of pillar; and support blocks, disposed on two sides of the support base body, a top of the support block having a support surface for withstanding a bottom of the enhanced beam of the backplane of the LCTV.

10. The moving device for LCTV as claimed in claim 9, characterized in that the support surface of the support block is lower than the upper surface of the support base.

11. The moving device for LCTV as claimed in claim 10, characterized in that a placement board is disposed at a location on each support rack near the support base, for withstanding a bottom of the LCTV.

12. The moving device for LCTV as claimed in claim 11, characterized in that an L-shaped fixing element is further disposed on each support rack at a location near the placement board, a part of the fixing element is attached to the support rack and the other part of the fixing element extends upwards in a direction substantially parallel to the support element of the long stripe configuration.

13. The moving device for LCTV as claimed in claim 11, characterized in that the backplane of the LCTV to be moved is disposed vertically with two enhanced beams of long stripe configuration, the enhanced beam is formed by bending a plate material with a U-shaped cross-section; the enhanced beam forms an accommodation space with the backplane of LCTV, the accommodation space is for at least housing a part of support rack and the long stripe-shaped support element on the support base.

14. The moving device for LCTV as claimed in claim 13, characterized in that the enhanced beam on the backplane is defined with at least a screw hole and the support base is also defined with at least a screw hole at corresponding position for fixing the enhanced beam on the backplane to the support base by using a screw to penetrate the corresponding screw holes on the enhanced beam on the backplane and the support base respectively.

15. The moving device for LCTV as claimed in claim 11, characterized in that the backplane of the LCTV to be moved is disposed vertically with two enhanced beams of long stripe configuration, the enhanced beam is formed by bending a plate material with a U-shaped cross-section; the enhanced beam forms an accommodation space with the backplane of LCTV, the accommodation space is for at least housing a part of support rack body and the long stripe-shaped support element on the support base.

* * * * *